W. KAISLING.
OPERATOR'S KEY.
APPLICATION FILED APR. 15, 1912.
1,230,410.
Patented June 19, 1917.
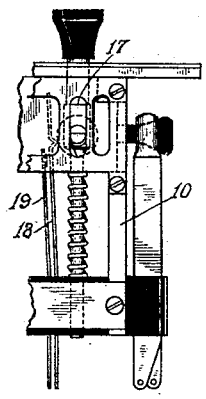
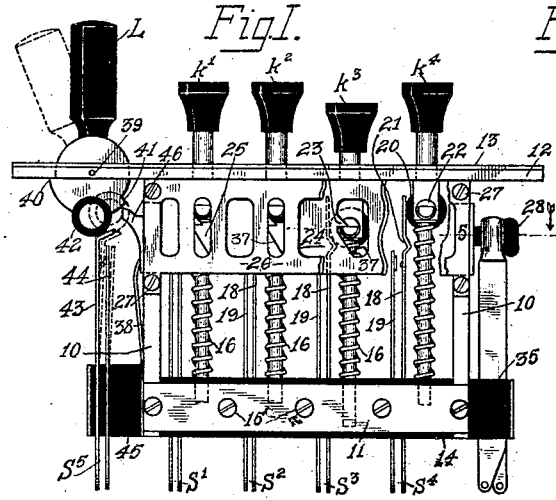
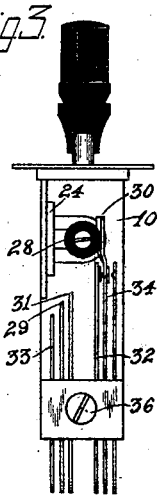
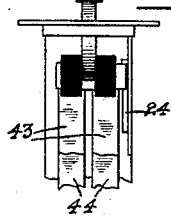
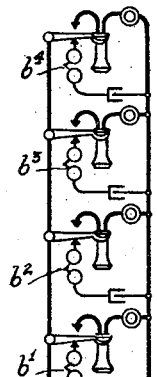
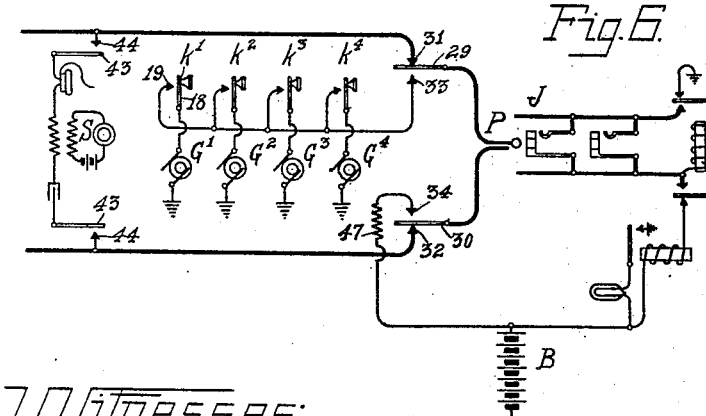
Witnesses:
G. E. Mueller.
Wm Berghahn
Inventor:
William Kaisling
By Curtis B. Camp
Attorney.

UNITED STATES PATENT OFFICE.

WILLIAM KAISLING, OF CHICAGO, ILLINOIS, ASSIGNOR TO KELLOGG SWITCHBOARD AND SUPPLY COMPANY, OF CHICAGO, ILLINOIS, A CORPORATION OF ILLINOIS.

OPERATOR'S KEY.

1,230,410.         Specification of Letters Patent.     Patented June 19, 1917.

Original application filed March 7, 1907, Serial No. 361,130. Divided and this application filed April 15, 1912. Serial No. 690,968.

*To all whom it may concern:*

Be it known that I, WILLIAM KAISLING, a citizen of the United States, and resident of Chicago, county of Cook, and State of Illinois, have invented certain new and useful Improvements in Operators' Keys, of which the following is a specification.

The present invention relates to telephone keys such as are employed in operators' link-circuit connecting apparatus and has to do more particularly with that type known as "listening and ringing keys," by the use of which the operator can include her telephone set in circuit and apply ringing current to the line for signaling purposes, and especially for signaling one of a number of subscribers on the line. The present application is a division of my Letters Patent for telephone key, granted March 27, 1916, No. 1,176,759.

The principal object of the invention is to provide a key of the character indicated, possessing certain novel features of construction together with a novel arrangement of parts which enable the key to be economically manufactured while leaving it compact and simple in construction and efficient in operation. One of the features of the invention consists of a novel catch mechanism for maintaining the different actuating members of the key in their various operating positions. Another feature consists in the employment of novel means for restoring the listening key to its normal position upon the operation of any one of the ringing keys. The invention also includes other features and details which, together with the above, will be more fully understood upon reference to the following detailed description taken in connection with the accompanying drawing, and the scope of the invention will be particularly pointed out in the appended claims.

Figure 1 is a side elevation of the key. Fig. 2 is a similar elevation of a portion of the same, illustrating a ringing key in its fully depressed position; Fig. 3 is an end elevation of the same, viewed from the right; Fig. 4 is a fragmentary elevation of the same, viewed from the left; Fig. 5 is a detailed section taken on a plane indicated by the line 5—5 of Fig. 1; Fig. 6 is a diagram of circuits illustrating one use of said key.

Throughout these views, like characters refer to like parts.

The combined key construction includes a plurality of ringing keys of the plunger type in association with a listening key of the lever type, all mounted compactly upon an elongated frame. Each longitudinally movable key has three operating positions—a normal, a fully depressed, and an intermediate position, the fully depressed position being the ringing position, and the intermediate position an indicating position. A longitudinally movable catch-bar coöperates with the ringing keys in retaining them in their various operating positions, and with the listening key to cause its restoration upon the operation of any of the ringing keys.

Referring in detail to the drawing, the various parts are mounted on a suitable supporting frame including the vertical members 10 united at their lower ends by plates 11 and at their upper ends by a strip 12 provided with a suitable face-plate 13. The strip 12 and face-plate 13 are provided with suitable openings through which the listening key lever L and each of a plurality of ringing keys $K'$—$K^2$—$K^3$—$K^4$ extend. The keys $K'$—$K^2$—$K^3$—$K^4$ extend downwardly into position to engage the upwardly extending sets of spring contacts $S'$—$S^2$—$S^3$—$S^4$ respectively. The springs are secured at their lower ends by a suitable insulating member 14 preferably secured between the plates 11 by screws 15 and arranged so as to properly space the springs of each set in the manner illustrated. The insulating member 14 is provided with suitable guiding openings through which the lower ends of the keys $K'$—$K^2$—$K^3$—$K^4$ are adapted to pass. The guiding ends of these keys are reduced in diameter and each is provided with a coiled returning spring 16 lying in close proximity to it and bearing at its opposite ends against the upper face of the insulating member 14 and a shoulder on the corresponding key. Each of the keys $K'$—$K^2$—$K^3$—$K^4$ is adapted to occupy three operating positions, referred to as normal, indicating and ringing positions. In the normal position, a shoulder 17 on the shank of each key rests against the under face of the strip 12, and the spring contacts of the particular set remain out of engagement. As clearly illustrated, each set of contacts S'—S²—S³—S⁴ consists of an actuated contact 18 and a coöperating contact 19. Contact 18 is somewhat longer than contact 19 and its upper end bears against the insulating block 20 carried by the shank of the key. This shank is adapted to coöperate with an inclined portion 21 of the spring 18. The coöperating inclined face is preferably provided by giving the spring contact 18 an angular bend such as clearly shown in Fig. 1. As the key is moved downward, the insulating block 20 engages the inclined portion 21 and the contacts 18—19 are moved into engagement, as illustrated in Fig. 2. Each key is provided with a laterally projecting pin 22, having a horizontal upper face, adapted to coöperate with catch projections 23 formed in the walls of openings of a longitudinally movable catch-bar 24. The outer ends of the pins 22 extend through vertical guiding slots 25, formed in the guiding plate 26 which is fixed in position upon the frame, in the present instance by screws 27 threaded into the vertical frame members 10. In this form of the invention, only one longitudinally movable bar—namely the bar 24—is employed. As clearly shown in Figs. 3 and 5, this bar is provided with an insulating button 28 having inclined faces which coöperate with the curved ends of the spring contacts 29—30 to force them apart, out of engagement with contacts 31—32 and into engagement with contacts 33—34, respectively. These spring contacts 29—30—31—32—33—34 are suitably mounted at their lower ends on an insulating block 35 located at one end of the supporting frame in line with the insulating member 14 and preferably secured by a screw 36 to the adjacent member 10 of the frame. By reason of the inclination of the coöperating faces of the spring contacts 29—30 and the insulating button 28, the bar 24 tends to occupy the position illustrated in Fig. 1, with the contacts 29—31 and 30—32 in engagement; and when free, will always return to this position. Normally, when a key is depressed, the under face of the pin 22 engages the upper inclined face of the catch 23, and the continued downward movement of the key forces the bar 24 to the left—as viewed in Fig. 1—thereby moving all the catches 23 out of their engaging positions and releasing any previously engaged key. As the pin 22 on the depressed key passes the catch 23, the latter springs back into engaging position and the key will be held thereby from returning to normal. This catch is located, however, so as to engage the pin 22 when the key is in an intermediate or indicating position. Further downward movement of the key will therefore bring the lower face of the pin 22 into engagement with an inclined face 37 of the bar 24 and thereby forcibly move the same far enough to actuate the spring contacts 29—30. When the depressed key has reached this position, its insulating block 20 will have engaged the inclined portion 21 of the contact 18, and the latter will have been forced into engagement with its associated spring contact 19. The key will remain in this fully depressed position only as long as force is applied to it. As soon as such force is removed, the key will tend to return to its normal position under the action of its returning spring 16, and the bar 24 will move to the right under the action of the spring contacts 29 and 30 upon the insulating button 28. This return movement is also assisted by a leaf-spring 38 which bears at its upper end against the left-hand end of the bar 24 and is firmly secured to the frame member 10 at its lower end. As a result of the removal of pressure from the depressed key, therefore, it will return until the upper face of the pin 22 engages the lower face of the catch 23. It will be held in this position until the catch-bar 24 is again reciprocated as a result of depressing another ringing key. By providing this indicating position, the operator can readily determine which key was last depressed, in case it is desired to again apply ringing current to the line, as will hereinafter more fully appear.

As previously indicated, the key structure includes the listening key lever L which extends through a suitable opening in the strip 12 and face-plate 13 and is pivoted at the point 39 to said face-plate. The lower circular portion of the lever L is provided with shoulders 40—41 which are adapted to engage the under side of the strip 12 to limit the movements of the lever. The lower end of the lever is provided with a projection having an insulated covering 42 which coöperates with a set of listening key contacts S⁵. This set includes two pairs of coöperating contacts 43—44. The contacts of each pair are normally out of engagement as illustrated in Fig. 1, but are adapted to be pressed into engagement by the movement of the lever L to the dotted line position of said figure. The set of spring contacts S⁵ is suitably secured to an insulating block 45 secured to the adjacent frame member 10. The upper end of the contacts 43 are inclined and so positioned that upon the movement of the lever L to its dotted line position, it will be retained in such position by reason of the relative position of the pivot point 39 and the point at which the force of the springs is applied. By reason of this bias, a slight movement of the lever L from its dotted line position toward its normal position will free it and allow it to return to normal under the action of the springs 43. For the purpose of returning the lever L whenever one of the ringing keys K'—K²—K³—K⁴ is depressed, the bar 24 is provided with a projection 46 which engages the lower portion of the lever L whenever said bar is actuated; and as a result, the lever L is moved far enough to allow it to return to normal under its bias.

In the diagram of Fig. 6, I have illustrated a portion of a link-circuit and a telephone line, having a plurality of substations, associated with it, with which the combined ringing and listening key, above described, may be employed. In the system of this diagram, selective ringing of the character described in Patent No. 779,533, granted Jan. 10, 1905, is employed. According to this arrangement, generators G'—G²—G³—G⁴ are designed to give current of different frequencies, and the call-bells b'—b²—b³—b⁴ at the sub stations are designed to respond only to current of the frequencies of the generators. In other words, the application of ringing current from generator G' will be instrumental in actuating one of the call-bells only, as, for example, call-bell b'; current from generator G² will actuate the call-bell b², and so on.

Assuming that the link-circuit of the diagram is connected with a calling line and that the operator has thrown her listening key lever L, so as to close each pair of contacts 43—44 and thereby include her telephone set S in circuit, and that it is learned that connection is desired with one of the sub stations on the line L' say, for example, the sub station having call bell b'; then, after testing the line L' in the usual manner, the operator will inform the calling party if the line is in use; and if not, she will insert the calling plug P into a jack J of the line L' and depress the appropriate ringing key K'—K²—K³—K⁴. Let it be assumed that the proper key to actuate the call-bell b' is that designated K'. Upon depressing the key K', the catch-bar 24 will be reciprocated and any key then in its indicating position will be released and allowed to return to normal. The depression of key K' to its ringing position will throw contacts 29—30 to their alternate positions and at the same time close contacts 18—19 of the ringing key K'. Thereupon current will be supplied from the battery B through the resistance 47, contacts 34—30, plug and jack sleeve contacts, through the winding of cut-off relay 48 to ground, thereby actuating the cut-off relay and maintaining it actuated. At the same time, ringing current will be applied to the tip side of the circuit from the generator G' over a path which may be traced from the live pole of the generator, through contacts 18—19 of key K', contacts 33—29, plug and jack tip contacts, through the call-bells at the various sub stations, and back through the winding of the cut-off relay to ground. By reason of the frequency of the current supply, the call-bell b' only will be actuated. As previously indicated, ringing current will be applied to the line only when the key K' is fully depressed; and as soon as the operator removes her finger from the key, it will return to its intermediate or indicating position and thereafter, if it becomes necessary to again signal the party at the sub station previously called, she may readily determine which key should be again depressed. In this instance, the removal of the plug P from its jack J at the end of conversation will not affect the position of the ringing key K', but it will be restored only upon the subsequent depressing of another ringing key K², K³ or K⁴. In this connection, it should also be noted that upon the first full downward pressure of the ringing key K', the listening key lever L was returned to its normal position.

While I have illustrated my invention in a specific form, many changes and modifications will readily suggest themselves, but I aim to cover all such changes and modifications as come within the spirit and scope of the appended claims.

What I claim as new and desire to secure by United States Letters Patent is:

1. In a selective ringing key, the combination with a plurality of longitudinally reciprocating plungers having ringing and indicating positions and associated sets of contact springs adapted to be individually actuated thereby, of transversely extending detents respectively provided upon said plungers, a universal slide-bar equipped with angularly disposed recesses and under-cut points associated with said detents to hold said plungers when moved to an indicating position, a set of spring contacts for said slide-bar, and coöperating means between said plungers and slide-bar whereby said set of contacts is operated upon movement of any plunger to its ringing position.

2. A telephone key comprising longitudinally reciprocating actuating keys having fully depressed and intermediate positions, sets of spring contacts for said keys, catch projections for said keys, a sliding catch-bar adapted to engage the catch projection of an actuated key and hold it in its intermediate position, a set of contacts controlled by said catch-bar, and means whereby said catch-bar is transversely moved to operate its set of contacts when any key is moved to its fully depressed position.

3. A telephone key comprising longitudinally reciprocating actuating keys, sets of spring contacts for said keys, a catch bar adapted to coöperate with said keys for holding them in an actuated position, means for slidingly supporting said catch bar in operative relation to said keys whereby said bar is transversely moved when any of said keys are depressed, a common set of contacts under the exclusive control of said catch bar, and means whereby said catch bar is transversely moved to operate said common set of contacts each time one of said plungers is depressed.

4. A telephone key comprising longitudinally reciprocating actuating keys having laterally projecting catch pins, sets of spring contacts for said keys, a catch bar slidingly supported and adapted to engage the catch pin of an actuated key to hold it in an operated position, means to prevent the transverse movement of the catch pins, a set of contacts common to said keys, means for independently operating said set, said catch bar when moved to engage the catch pin of an actuated key being adapted to restore said common set of contacts, and an auxiliary set of contacts under the exclusive control of said catch bar.

5. A key comprising actuating plungers, sets of spring contacts for said plungers, a common slidably mounted plate for locking said plungers when moved to an actuated position, means normally holding said plate in a locking position whereby when a plunger is depressed said plate is moved out of its normal position and is restored by said means to hold the actuated plunger, and a common set of contacts under sole control of said plate and actuated thereby when a plunger is depressed.

6. A telephone key comprising longitudinally reciprocating actuating keys, sets of spring contacts for said keys, a frame for supporting said keys and contacts, a flat catch bar slidingly supported alongside of said keys with its flat surface parallel to the longitudinal movement of the keys, detents for said keys adapted to coöperate with said catch bar to hold an actuated key in an operated position, a set of contacts common to said keys, a manually operable member for independently operating said common set, and an extended member for said catch bar for restoring the said manual member when said catch bar is moved to engage the catch pin of an actuated key whereby said manual member and common contact set are restored.

7. A selective ringing key comprising a plurality of longitudinally reciprocating plungers and associated sets of contact springs, transversely extending detents provided upon said plungers, a universal slide bar equipped with angularly disposed recesses and under cut openings associated with said detents to hold said plungers when moved, a set of spring contacts for said sliding bar, coöperating means between said plunger and sliding bar whereby said set of contacts is operated upon movement of any plunger, a second set of contacts common to said plungers, a manually operable member for independently operating said second common set, and means whereby the actuation of any plunger will cause said slide bar to restore said manually operable member and associated contacts.

8. A party-line ringing key provided with a plurality of actuating devices having detents, switching mechanism under the control of each device, further switching mechanism controllable by either device, said devices having a normal position, a circuit controlling position and an intermediate position, and an endwise longitudinally slidable catch bar provided with an orifice for coöperation with each of said detents whereby when a device is moved from an intermediate position to a circuit controlling position all other actuating devices not in normal position are restored to normal position.

9. A party-line ringing key provided with an elongated mounting frame, a plurality of alined reciprocatingly mounted actuating devices, switching mechanism under the control of each device, further switching mechanism controllable by either device, said devices being movably mounted to permit movement from a normal to a switch controlling position, detents for said devices for holding them in an intermediate position, an endwise slidable catch bar for said devices provided with protuberances for coöperation with said detents whereby any device in an intermediate position will be returned to its normal position when a device is moved from an intermediate position to a switch controlling position, and means controlled by said slidable bar for operating the said common switch mechanism.

10. A party-line ringing key provided with a plurality of actuating devices, switch contacts under the control of each device, said devices being reciprocatingly mounted to permit movement from a normal to a switch controlling position, an endwise slidable lock bar provided with an orifice for each of said actuating devices for holding an actuating device in an intermediate position, coöperating means including a pin for said actuating device and its corresponding orifice to release any held devices when said device is moved from an intermediate position to a switch controlling position, and a manually operable member controlled by said lock bar.

11. A party-line ringing key provided with an elongated mounting frame, a plurality of actuating plungers movably mounted in said frame, switch mechanism under the control of each plunger, common switch mechanism controllable by either plunger, said plungers each having a normal position, a circuit controlling position and an intermediate position, a rocking actuating member, and a single movable member controlled by each plunger to release any intermediately held plungers when a plunger is moved from an intermediate to a switch controlling position and for actuating said rocking member.

12. A party-line ringing key provided with a plurality of reciprocatingly mounted plungers, a switch controlling member, switching mechanism under the control of each plunger, the said plungers being mounted so as to be movable from a normal to a switch controlling position, a reciprocatory plate for holding an actuated plunger in an intermediate position, means controllable by each plunger to cause said reciprocatory plate to release any intermediately held plungers when a plunger is moved from an intermediate to a switch controlling position and for actuating said switch controlling member and switch springs common to said members under the exclusive control of said reciprocatory plate.

13. A party-line ringing key including actuating plungers and a rocking member, said plungers each having a normal position, a circuit controlling position and an intermediate position, a movable member controlled by a plunger to release any intermediately held plungers when it is moved from an intermediate to a switch controlling position and for actuating said rocking member, and common switch springs operated by each actuation of a plunger from its intermediate to its circuit controlling position.

14. A combination key including a plurality of actuating devices and a rocking member, switching mechanism under the control of each device and member, further switching mechanism controllable by either device, said devices being movably mounted to permit movement from a normal to a switch controlling position, means for holding an actuated device in an intermediate position, and means provided for said devices to control said first aforesaid means to release any held devices when a device is moved from an intermediate position to a switch controlling position, said first aforesaid means also operating to control said rocking member.

15. A key of the class described including a plurality of reciprocatingly mounted devices and a two-way rocking lever, switching mechanism for each of said devices, said devices each having a normal position, a circuit controlling position and an intermediate position, a slidable bar for restoring said rocking member from an actuated position and for holding an actuated device in an intermediate position, means provided for said devices to control said slidable bar to release any held device when a device is moved from an intermediate to a switch controlling position, and switch springs common to said device operable each time one of said devices is moved from its intermediate to its circuit controlling position.

Signed by me at Chicago, county of Cook, and State of Illinois, in the presence of two witnesses.

WILLIAM KAISLING.

Witnesses:
GEORGE E. MUELLER,
BESSIE O'BRIEN.

Copies of this patent may be obtained for five cents each, by addressing the "Commissioner of Patents, Washington, D. C."